United States Patent
Byrne

(10) Patent No.: US 10,612,490 B2
(45) Date of Patent: Apr. 7, 2020

(54) DRAG LINK ASSEMBLY INCLUDING BURIED DRAG LINK FITTING

(71) Applicant: Rohr, Inc., Chula Vista, CA (US)

(72) Inventor: Stuart J. Byrne, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 694 days.

(21) Appl. No.: 14/262,393

(22) Filed: Apr. 25, 2014

(65) Prior Publication Data

US 2015/0308381 A1 Oct. 29, 2015

(51) Int. Cl.
| | |
|---|---|
| F02K 1/76 | (2006.01) |
| F02K 1/62 | (2006.01) |
| F02K 1/70 | (2006.01) |
| F16C 11/04 | (2006.01) |

(52) U.S. Cl.
CPC .............. *F02K 1/763* (2013.01); *F02K 1/62* (2013.01); *F02K 1/625* (2013.01); *F02K 1/70* (2013.01); *F02K 1/76* (2013.01); *F02K 1/766* (2013.01); *F16C 11/045* (2013.01); *F16C 2360/00* (2013.01)

(58) Field of Classification Search
CPC ... F02K 1/766; F02K 1/70; F02K 1/72; F02K 1/763; F02K 1/625; F02K 1/76; F02K 1/62
See application file for complete search history.

(56) References Cited

U.S. PATENT DOCUMENTS

| | | | |
|---|---|---|---|
| 3,262,270 A | 7/1966 | Beavers | |
| 3,262,271 A | 7/1966 | Beavers | |
| 3,541,794 A | 11/1970 | Johnston | |
| 4,185,798 A | 1/1980 | Dickenson | |
| 4,356,973 A * | 11/1982 | Lawson | F02K 1/72 239/265.31 |
| 4,545,199 A | 10/1985 | Sankey et al. | |
| 5,251,435 A | 10/1993 | Pauley | |
| 5,927,647 A | 7/1999 | Masters et al. | |
| 8,104,261 B2 | 1/2012 | Marshall et al. | |
| 8,104,262 B2 | 1/2012 | Marshall | |
| 8,109,467 B2 * | 2/2012 | Murphy | F02K 1/72 244/110 B |
| 8,876,018 B2 * | 11/2014 | Vauchel | B64D 29/06 239/265.19 |

(Continued)

OTHER PUBLICATIONS

Search report for FR1553718 dated Dec. 7, 2017.

*Primary Examiner* — Steven M Sutherland
*Assistant Examiner* — Thuyhang N Nguyen
(74) *Attorney, Agent, or Firm* — Getz Balich LLC

(57) ABSTRACT

A drag link assembly for use in a thrust reverser of a propulsion system is provided. The thrust reverser includes a fixed structure and a translating structure that at least partially define an annular airstream bypass duct there between. The translating structure is moveable relative to the fixed structure. The translating structure includes a blocker door disposed at least partially within the airstream bypass duct. The drag link assembly includes a drag link fitting and a drag link. The drag link fitting is fastened to the fixed structure of the thrust reverser. The drag link includes a first end portion and an opposing second end portion. The first end portion is pivotably connected to the blocker door. The second end portion is pivotably connected to the drag link fitting. The second end portion includes a curved section.

20 Claims, 12 Drawing Sheets

(56) References Cited

U.S. PATENT DOCUMENTS

| | | | |
|---|---|---|---|
| 9,212,689 B2 * | 12/2015 | Vauchel | F02K 1/1261 |
| 2013/0062434 A1 * | 3/2013 | Vauchel | B64D 33/04 |
| | | | 239/265.19 |
| 2014/0027537 A1 | 1/2014 | Binks et al. | |
| 2014/0150403 A1 | 6/2014 | Stuart et al. | |

* cited by examiner

DRAG LINK ASSEMBLY INCLUDING BURIED DRAG LINK FITTING

BACKGROUND

1. Technical Field

Aspects of the present invention relate to a propulsion system nacelle that includes a thrust reverser, and more particularly relate to a drag link assembly included in the thrust reverser of a propulsion system nacelle.

2. Background Information

It is known to provide a propulsion system that includes an engine (e.g., a gas turbine engine), a nacelle that at least partially surrounds the engine, and a pylon that connects the engine and the nacelle to a vehicle (e.g., an aircraft). In some instances, the nacelle includes a thrust reverser, and the thrust reverser includes a plurality of blocker doors. In such instances, the blocker doors can be moved from a stowed position to a deployed position, and can thereby redirect a bypass duct airstream so that it is discharged through an array of cascades. The thrust reverser also includes a plurality of drag link assemblies, each of which includes a drag link and a drag link fitting. A radially outer end portion of each drag link is pivotably connected to a blocker door, and a radially inner end portion of each drag link is pivotably connected to a drag link fitting. In previous drag link assembly designs, the drag link fittings are mounted on an aerodynamic surface of the thrust reverser that partially defines the bypass duct. In such designs, the drag link fitting extends radially into the bypass duct, and thus negatively impacts the aerodynamic flow of the bypass duct airstream. Aspects of the present invention are directed to this and other problems.

SUMMARY OF ASPECTS OF THE INVENTION

According to an aspect of the present invention, a drag link assembly for use in a thrust reverser of a propulsion system is provided. The thrust reverser includes a fixed structure and a translating structure that at least partially define an annular airstream bypass duct there between. The translating structure is moveable relative to the fixed structure. The translating structure includes a blocker door disposed at least partially within the airstream bypass duct. The drag link assembly includes a drag link fitting and a drag link. The drag link fitting is fastened to the fixed structure of the thrust reverser. The drag link includes a first end portion and an opposing second end portion. The first end portion is pivotably connected to the blocker door. The second end portion is pivotably connected to the drag link fitting. The second end portion includes a curved section.

According to another aspect of the present invention, a thrust reverser of a gas turbine propulsion system for an aircraft is provided. The thrust reverser includes a blocker door, a drag link fitting, and a drag link. The blocker door pivots between a stowed position, and a deployed position in which the blocker door redirects air to generate reverse thrust. The drag link fitting is fastened to a fixed structure of the thrust reverser at least in part by a fastener. The drag link has a first end and a distal second end. The first end is pivotably attached to the blocker door, and the second end is pivotably attached to the drag link fitting. The second end of the drag link is disposed at least partially in a channel of the drag link fitting. The fastener is disposed at least partially in the channel and below the second end of the drag link.

Additionally or alternatively, the present invention may include one or more of the following features individually or in combination:

the thrust reverser extends between a forward end and an aft end along an axial centerline, and the thrust reverser extends circumferentially about the axial centerline; the fixed structure of the thrust reverser includes a radially inner fixed structure and a radially outer fixed structure; and the drag link fitting is buried within the inner fixed structure;

the fixed structure of the thrust reverser includes a radially inner fixed structure and a radially outer fixed structure; at least a portion of the drag link fitting is disposed in a cavity that extends radially into the inner fixed structure; the cavity extends radially between an inner surface of the inner fixed structure and an opposing aerodynamic surface of the inner fixed structure; and the aerodynamic surface partially defines the airstream bypass duct;

a radially outermost surface of the drag link fitting is at least substantially radially aligned with an aerodynamic surface of the inner fixed structure; and the aerodynamic surface partially defines the airstream bypass duct;

the radially outermost surface of the drag link fitting is at least substantially flush with the aerodynamic surface;

the thrust reverser extends between a forward end and an aft end along an axial centerline, and the thrust reverser extends circumferentially about the axial centerline; the drag link extends at least substantially along a radially-extending drag link axis; and a pivot point of the drag link relative to the drag link fitting is aft of, and offset from, the drag link axis;

the fastener is at least substantially covered by the drag link when the drag link is in a first pivot position relative to the drag link fitting, and the fastener is at least partially exposed when the drag link is in a second pivot position relative to the drag link fitting;

the fastener is at least partially exposed to a bypass airstream duct of the thrust reverser when the drag link is in a second pivot position relative to the drag link fitting;

the channel is at least substantially covered by the drag link when the drag link is in a first pivot position relative to the drag link fitting, and the channel is at least partially exposed when the drag link is in a second pivot position relative to the drag link fitting; and the channel is at least partially exposed to a bypass airstream duct of the thrust reverser when the drag link is in a second pivot position relative to the drag link fitting.

These and other aspects of the present invention will become apparent in light of the drawings and detailed description provided below.

DETAILED DESCRIPTION OF ASPECTS OF THE INVENTION

Figure 1:
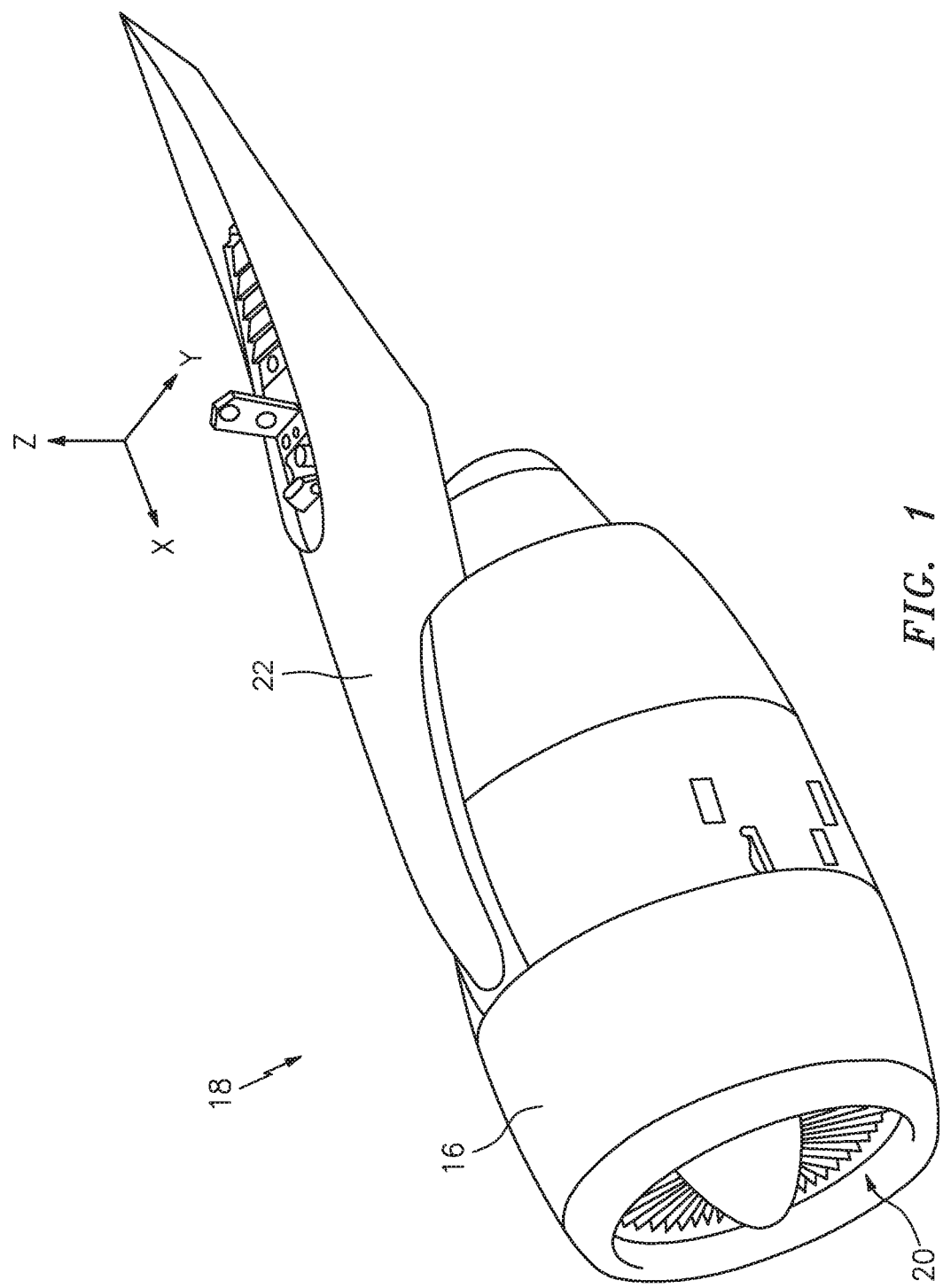
FIG. 1 is a perspective view of a propulsion system.

The present disclosure describes embodiments of a drag link assembly 10 (see FIGS. 3-6 and 8-12) that includes a drag link fitting 12 and a drag link 14.

The present disclosure describes aspects of the present invention with reference to the exemplary embodiments illustrated in the drawings; however, aspects of the present invention are not limited to the exemplary embodiments illustrated in the drawings. The present disclosure may describe one or more features as having a length extending relative to a x-axis, a width extending relative to a y-axis, and/or a height extending relative to a z-axis. The drawings illustrate the respective axes.

The present disclosure uses the terms "circumferential," "annular," "abut," and variations thereof, to describe one or more features. The term "circumferential," and variations thereof, are used herein to indicate that a feature extends along a curve that is centered about an axis of rotation. The term "annular," and variations thereof, are used herein to indicate that a feature is at least partially in the form of a ring (e.g., a ring in a circular shape or another shape). The term "abut", and variations thereof, are used herein to indicate either that a first feature is in direct contact with a second feature, or that a first feature is almost in direct contact with a second feature and is separated from the second feature only by one or more small gaps.

Figure 2:
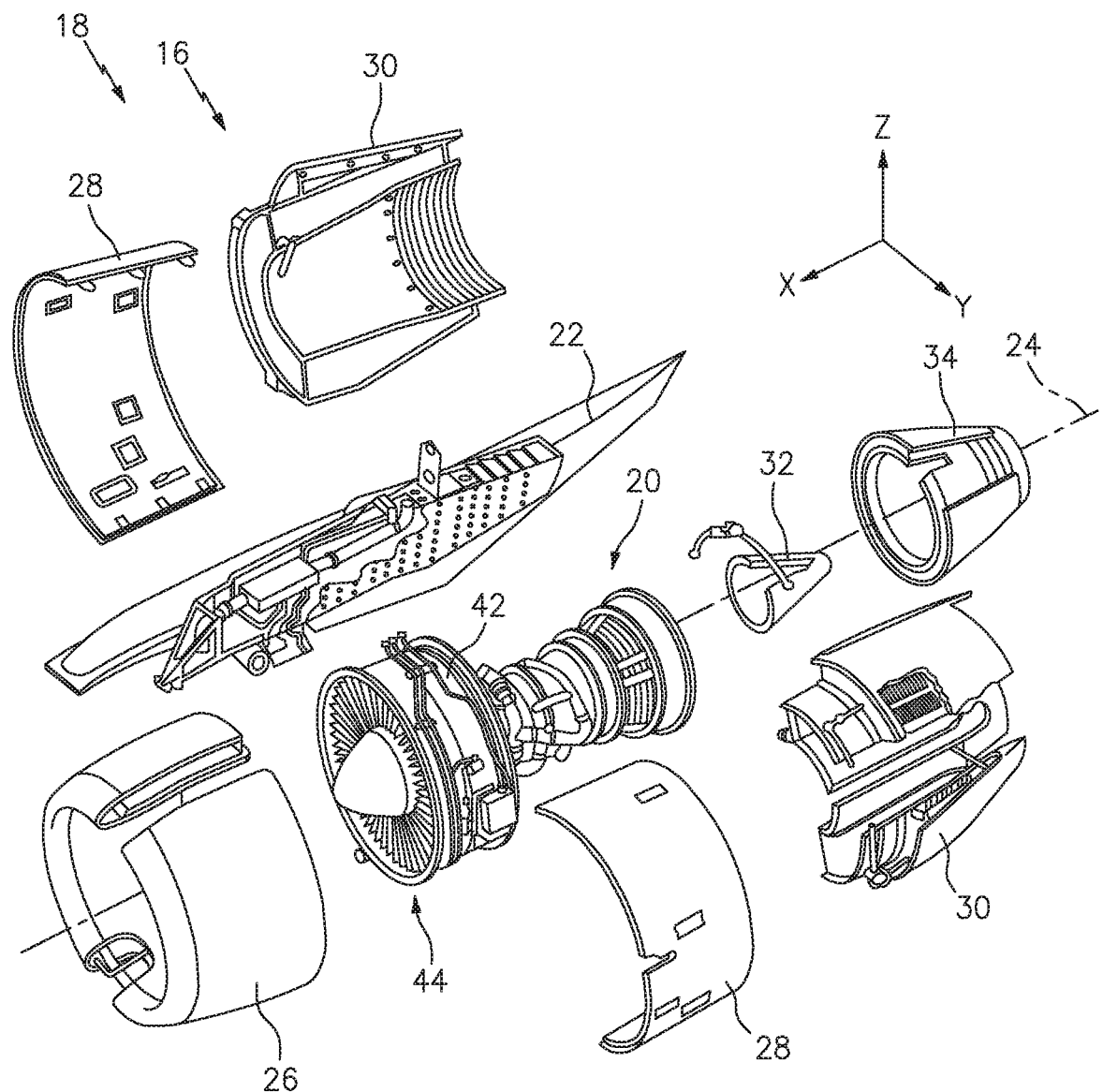
FIG. 2 is an exploded perspective view of the propulsion system of FIG. 1.

Referring to FIG. 1, the drag link assembly 10 (see FIGS. 3-6, and 8-12) is included in a nacelle 16, and the nacelle 16 is included in a propulsion system 18. The propulsion system 18 and the nacelle 16 can be configured in various different ways. In the illustrated embodiment, the propulsion system 18 is a turbofan-type propulsion system that includes the nacelle 16, a gas turbine engine 20, and a pylon 22. Referring to FIG. 2, the gas turbine engine 20 extends in a lengthwise direction along an axial centerline 24, between a forward end and an aft end. The nacelle 16 partially surrounds the gas turbine engine 20. The pylon 22 connects the nacelle 16 and the gas turbine engine 20 to the underside of an aircraft wing (not shown). The nacelle 16 includes an inlet 26, a fan cowl 28, a thrust reverser 30, an exhaust centerbody 32, and an exhaust nozzle 34. The drag link assembly 10 (see FIGS. 3-6, and 8-12) is included in the thrust reverser 30 portion of the nacelle 16.

Figure 3:
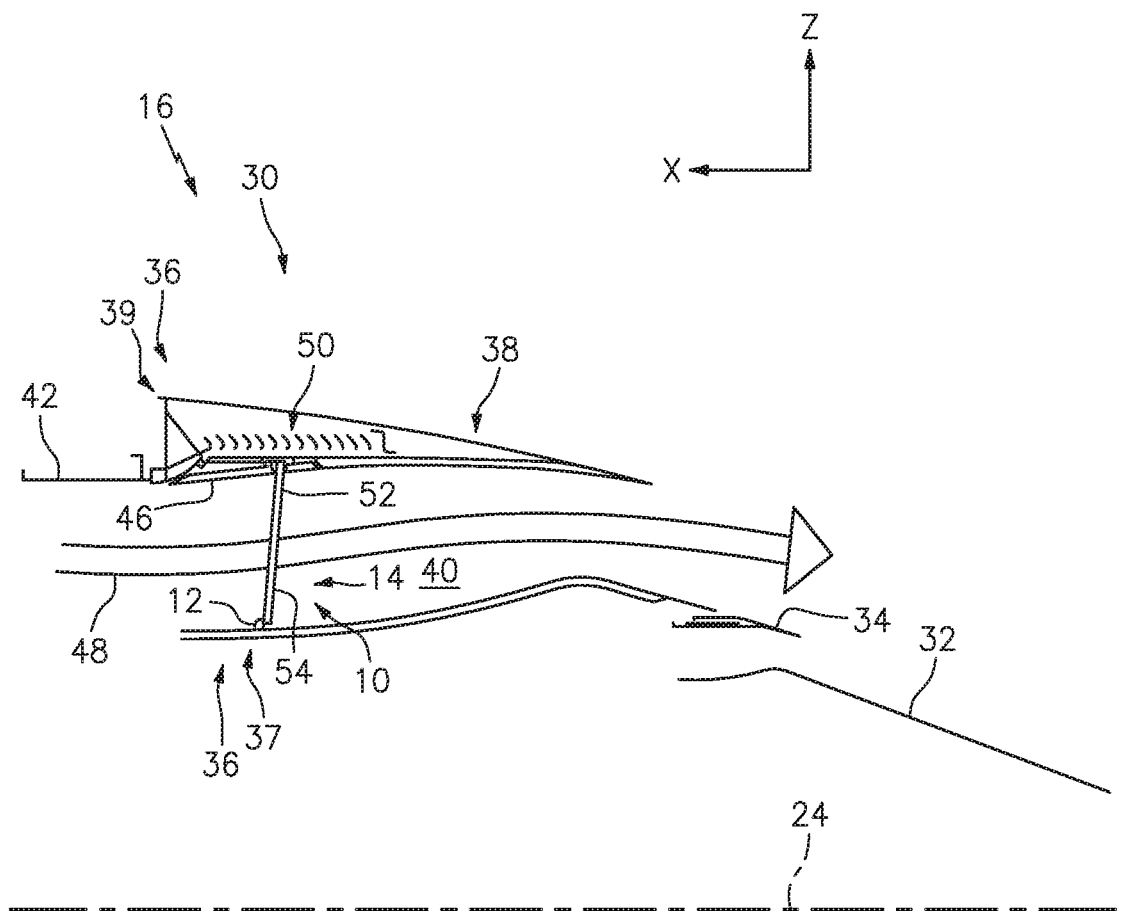
FIG. 3 is a sectional schematic view of the thruster reverser in its stowed position, the fan case, the exhaust centerbody, and the exhaust nozzle portions of the nacelle that are included in the propulsion system of FIG. 1.
Figure 4:
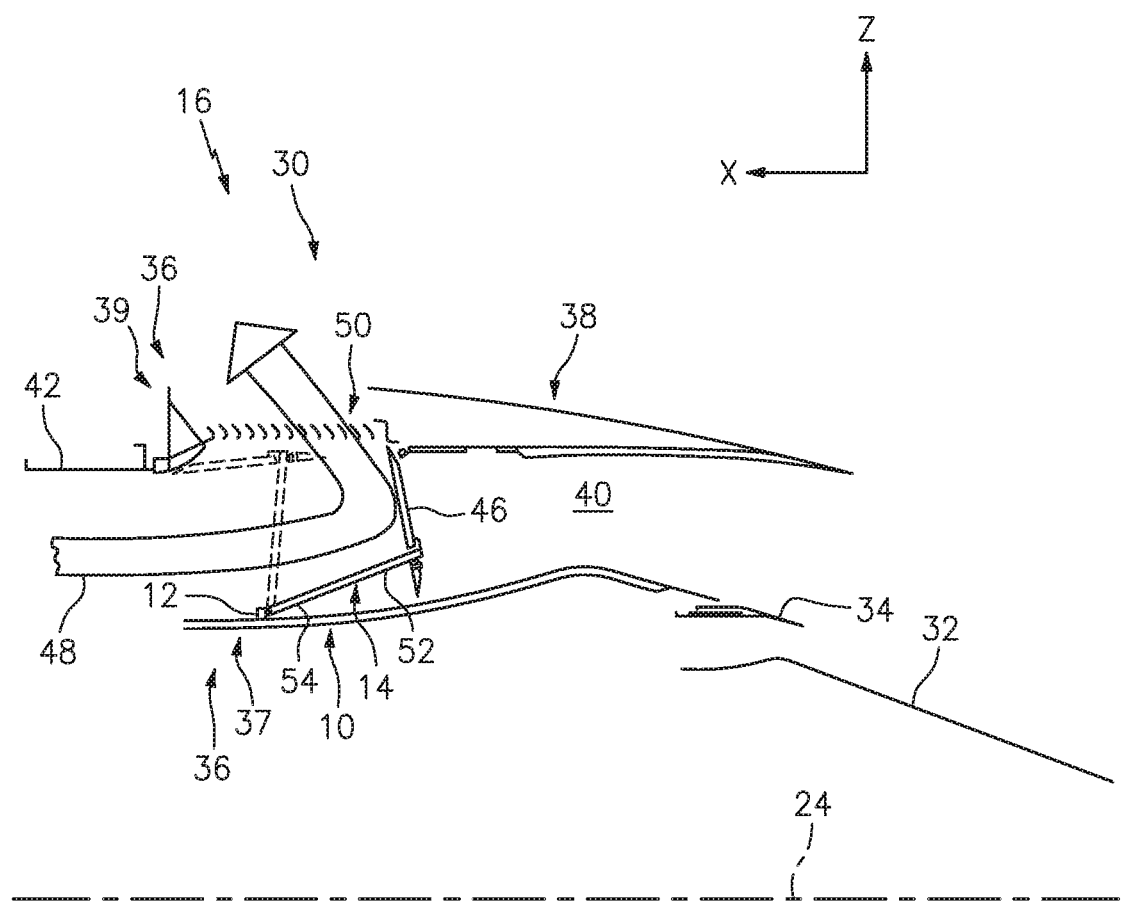
FIG. 4 is a sectional schematic view of the thrust reverser in its deployed position, the fan case, the exhaust centerbody, and the exhaust nozzle portions of the nacelle that are included in the propulsion system of FIG. 1.

Referring to FIGS. 3 and 4, in the illustrated embodiment the thrust reverser 30 is a cascade-type thrust reverser that includes a fixed structure 36 and a translating structure 38.

The fixed structure 36 and the translating structure 38 partially define an annular bypass duct 40. The fixed structure 36 includes a radially inner fixed structure 37 and a radially outer fixed structure 39. The outer fixed structure 39 extends in a generally lengthwise direction from an aft end of a fan case 42 that surrounds a fan section 44 of the gas turbine engine 20 (see FIG. 2). The translating structure 38 is selectively moveable (e.g., using one or more actuators) in a generally lengthwise direction relative to the fixed structure 36, between a stowed position (see FIG. 3) (e.g., during a forward thrust operation) and a deployed position (see FIG. 4) (e.g., during a thrust reversing operation). FIGS. 3 and 4 illustrate the relative positioning of the inner fixed structure 37, the outer fixed structure 39, and the translating structure 38 of the thrust reverser 30, as well as the fan case 42, the exhaust centerbody 32, and the exhaust nozzle 34 portions of the nacelle 16.

The translating structure 38 includes a plurality of blocker doors 46, each of which extends between a forward portion and an aft portion. The forward portion of each blocker door 46 is pivotably mounted to the translating structure 38 of the thrust reverser 30, and the aft portion of each blocker door 46 is pivotably connected to a drag link 14, as will be described in detail below. Each of the blocker doors 46 is moveable between a stowed position (see FIG. 3) (e.g., during a forward thrust operation) and a deployed position (see FIG. 4) (e.g., during a thrust reversing operation). The blocker doors 46 are configured to be in their respective stowed positions (see FIG. 3) when the translating structure 38 is in its stowed position (see FIG. 3), and are configured to be in their respective deployed positions (see FIG. 4) when the translating structure 38 is in its deployed position (see FIG. 4).

Referring back to FIG. 2, during operation of the propulsion system 18 in this embodiment, an airstream (not shown) enters the gas turbine engine 20 through the fan section 44 of the gas turbine engine 20, and the airstream is thereafter divided into at least a core airstream (not shown) and a bypass airstream 48 (see FIGS. 3 and 4). The core airstream enters the gas turbine engine 20, where it is compressed in a compressor section (not shown), heated in a combustor section (not shown), and expanded to produce rotational power in a turbine section (not shown). The core airstream is then discharged through the aft end of the gas turbine engine 20, and it is then finally discharged through the exhaust nozzle 34 portion of the nacelle 16 to provide forward thrust.

Referring again to FIGS. 3 and 4, when the translating structure 38 is in its stowed position (see FIG. 3), the bypass airstream 48 can pass from a forward end of the bypass duct 40 to an aft end of the bypass duct 40 and then to the exhaust nozzle 34, through which it can be discharged to provide forward thrust. The drag links 14 each block only a small portion of the bypass duct 40, and thus the bypass airstream 48 can pass around them relatively easily.

When the translating structure 38 is in its deployed position (see FIG. 4), the array of cascades 50 is exposed to the bypass airstream 48 passing through the bypass duct 40, and is exposed to ambient air surrounding the thrust reverser 30. The blocker doors 46 are deployed to redirect a portion of the bypass airstream 48 toward the array of cascades 50, through which the bypass airstream 48 can be discharged to generate reverse thrust.

Referring to FIGS. 3 and 4, each of the drag links 14 includes a radially outer end portion 52, a radially inner end portion 54, and a shaft portion that extends radially between the outer end portion 52 and the inner end portion 54. The outer end portion 52 of each drag link 14 is pivotably connected to an aft end of a blocker door 46, and the inner end portion 54 of each drag link 14 is pivotably connected to a drag link fitting 12 that is disposed relative to the inner fixed structure 37 of the thrust reverser 30, as will be described in detail below.

Referring to FIGS. 3 and 4, each of the drag links 14 is pivotably moveable about its inner end portion 54, between a stowed position (see FIG. 3) and a deployed position (see FIG. 4). The drag links 14 are configured to be in their respective stowed positions (see FIG. 3) when the translating structure 38 and its blocker doors 46 are in their respective stowed positions (see FIG. 3), and the drag links 14 are configured to be in their respective deployed positions (see FIG. 4) when the translating structure 38 and its blocker doors 46 are in their respective deployed positions (see FIG. 4).

In some embodiments (see, e.g., FIGS. 5, 6, and 8), the inner end portion 54 of the drag link 14 has a "straight" configuration, such that the inner end portion 54 and the shaft portion of the drag link 14 extend at least substantially along a common radially-extending axis. In other embodiments (see, e.g., FIGS. 9-12) in which the drag link 14 is said to be in a "clubfoot" configuration, the inner end portion 54 of the drag link 14 curves relative to the radially-extending axis of the shaft portion, and the shaft portion extends along a second axis that is angularly offset relative to the first axis. In the "clubfoot" configuration, the pivot point of the drag link 14 relative to the drag link fitting 12 is behind (i.e., aft of), and offset from, the radially-extending axis of the shaft portion of the drag link 14.

The shaft portion of each drag link 14 can be in-line with the axial centerline 24 of the gas turbine engine 20, or it can be "twisted." In embodiments in which the shaft portion is in-line with the axial centerline 24 (see FIGS. 5, 6, and 8), an axis extending between a leading edge and a trailing edge of the shaft portion extends in a lengthwise direction that is at least substantially parallel to the axial centerline 24 of the gas turbine engine 20 (see FIG. 2). In embodiments in which the shaft portion is twisted (see FIGS. 11 and 12), an axis 56 (see FIG. 12) extending between the leading edge and the trailing edge of the shaft portion is disposed at an angle (i.e., is offset) relative to the axial centerline 24.

Figure 8:
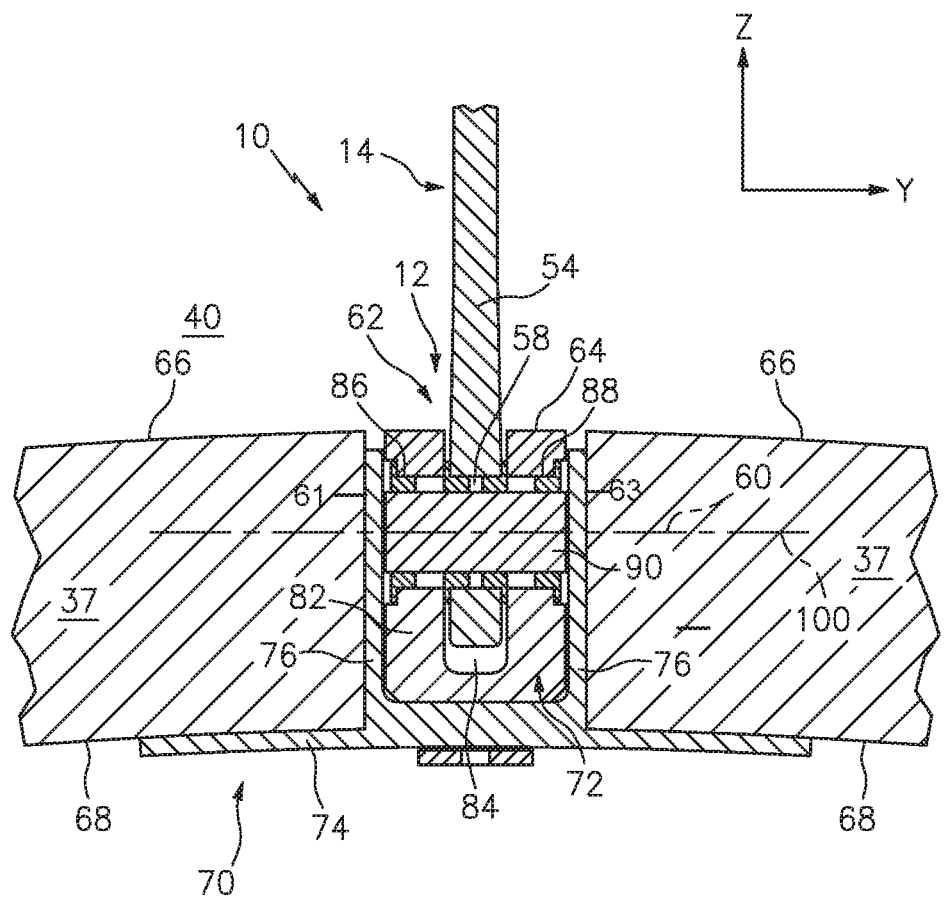
FIG. 8 is a sectional elevation view of the drag link assembly of FIG. 5.

Referring to FIG. 8, each of the drag links 14 also includes a drag link bearing 58 positioned within an aperture that extends through the inner end portion 54 of the drag link 14. The drag link bearing 58 enables the inner end portion 54 of each drag link 14 to be pivotably connected to a drag link fitting 12, between first and second portions 61 and 63 of the drag link fitting 12, as will be described in detail below. The drag link bearing 58 is aligned about a drag link bearing axis 60. The drag link bearing axis 60 extends in a widthwise direction that is at least substantially normal to the axial centerline 24 of the gas turbine engine 20 (see FIG. 2). This may be true even in embodiments in which the shaft portions of the drag links 14 are twisted, as described above.

Figure 5:
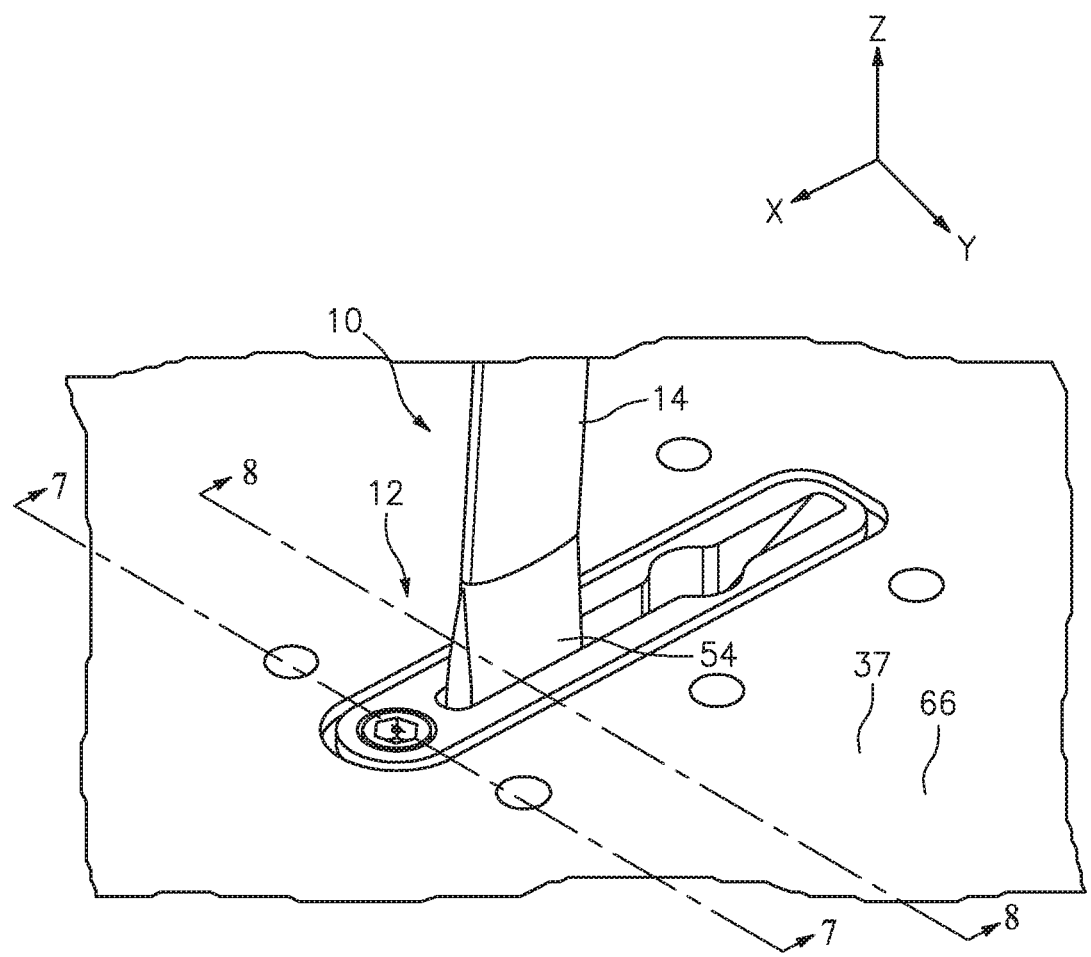
FIG. 5 is a perspective view of the drag link assembly that is included in the propulsion system of FIG. 1.
Figure 6:
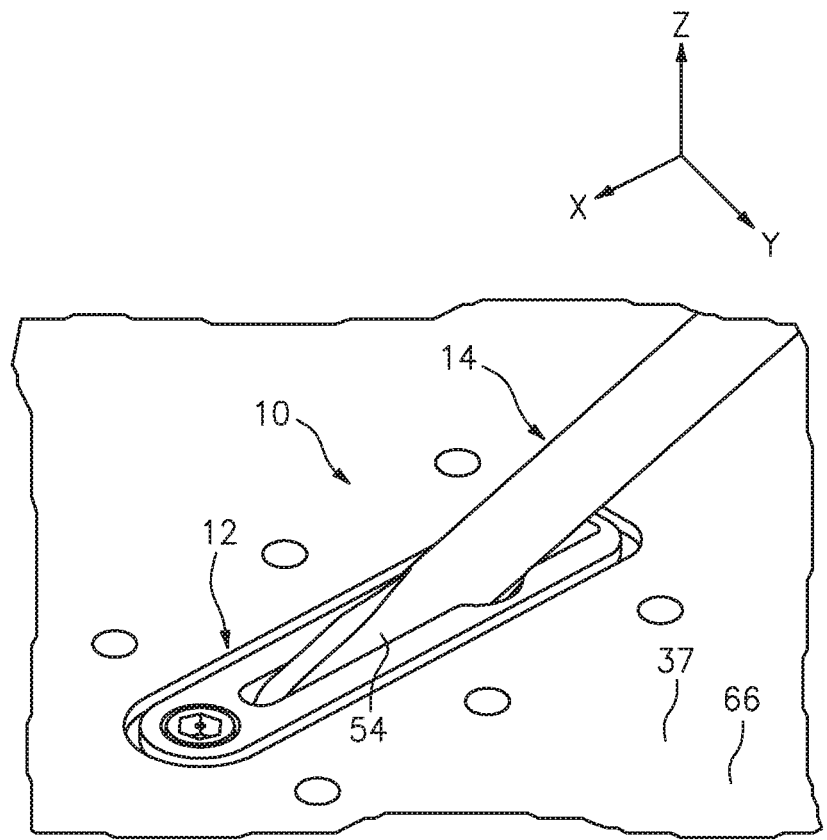
FIG. 6 is another perspective view of the drag link assembly of FIG. 5.
Figure 7:
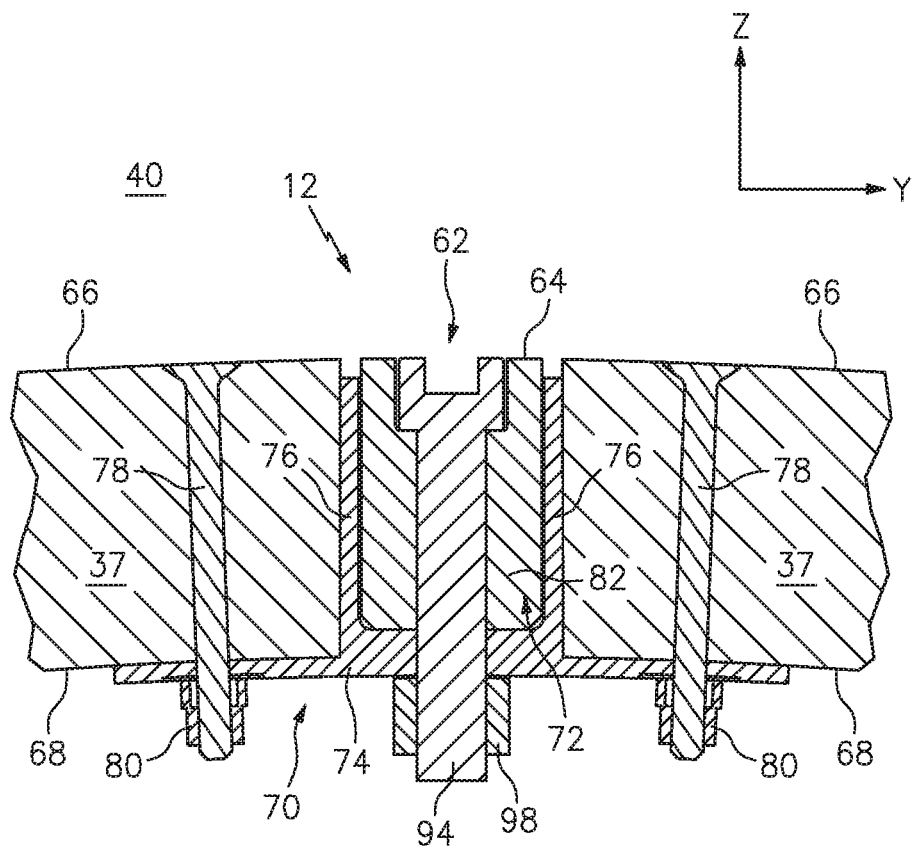
FIG. 7 is a sectional elevation view of the drag link fitting included in the drag link assembly of FIG. 5.
Figure 9:
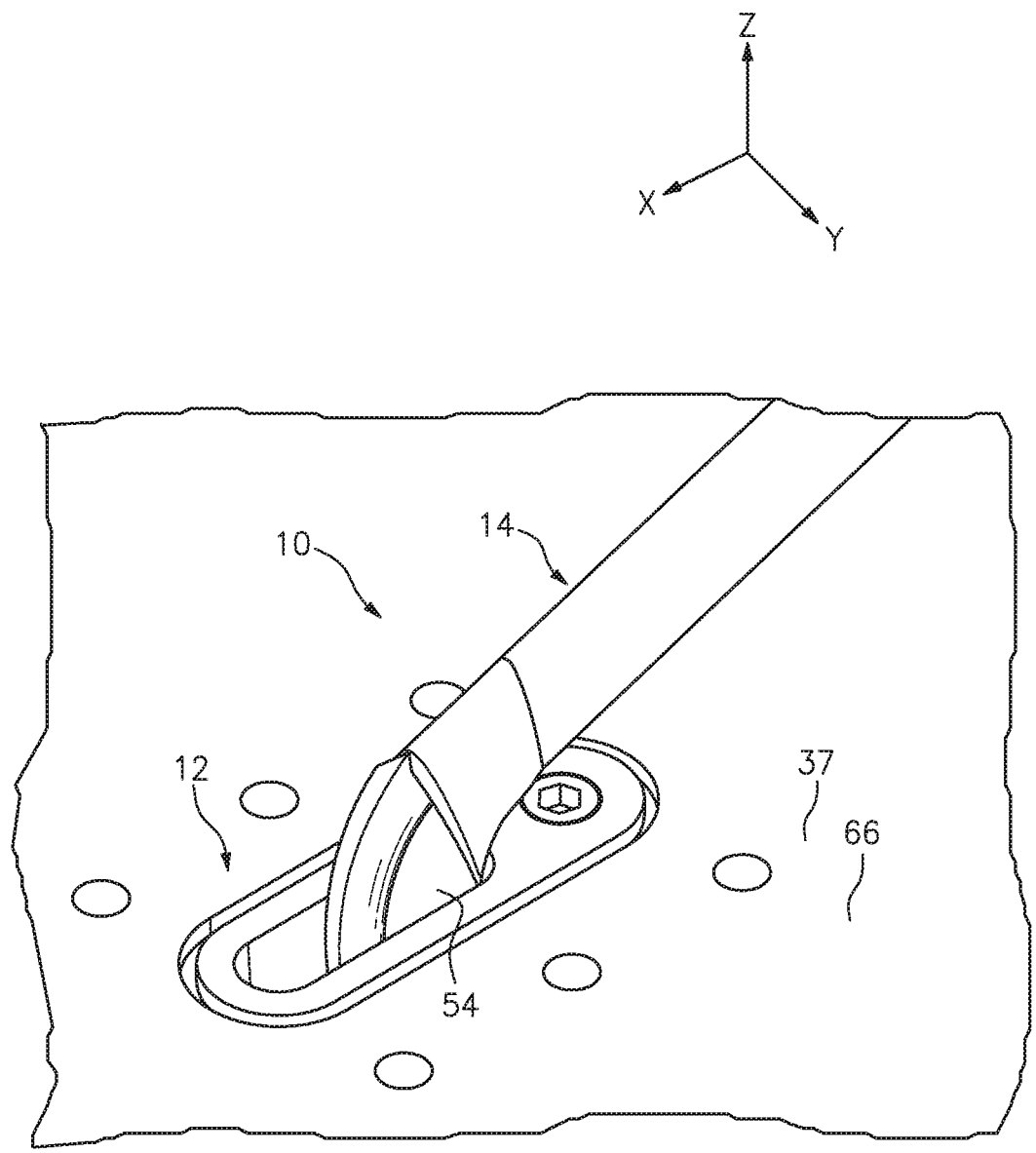
FIG. 9 is a perspective view of another drag link assembly embodiment.
Figure 10:
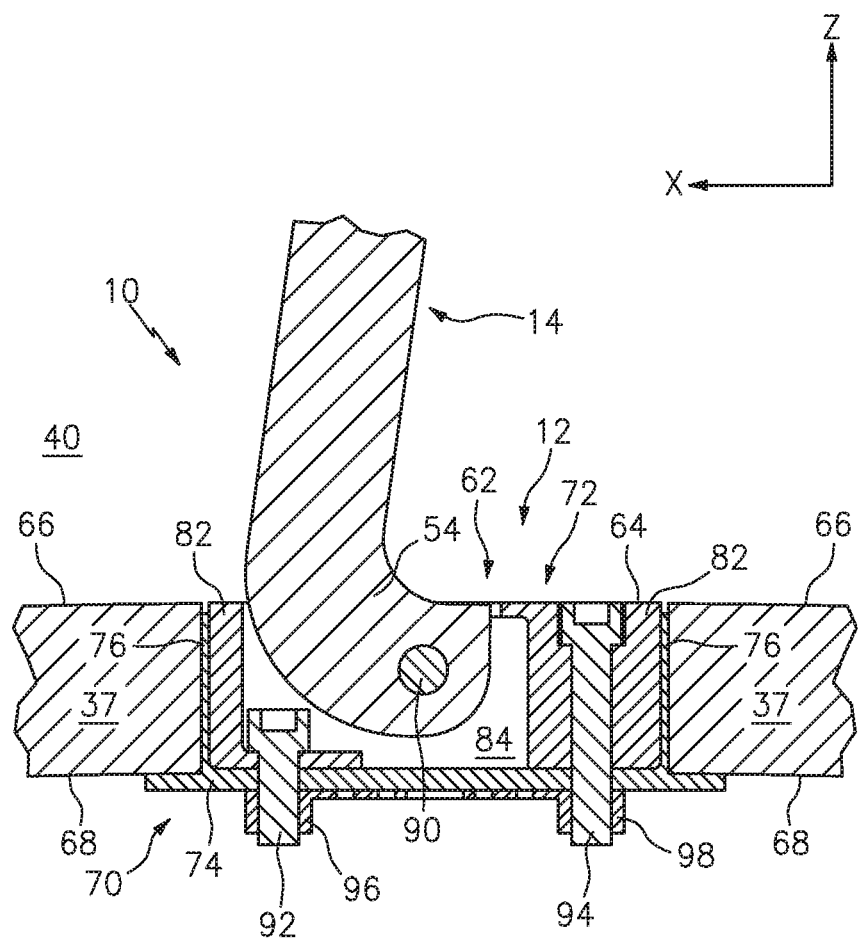
FIG. 10 is a sectional elevation view of the drag link assembly of FIG. 9.

Referring to FIGS. 5-12, each of the drag link fittings 12 is "buried" in the inner fixed structure 37 of the thrust reverser 30 (see FIGS. 2-4). The term "buried," and variations thereof, are used herein relative to the drag link fittings 12 to indicate that at least substantially all of the drag link fitting 12 is recessed in a cavity 62 (see FIGS. 7, 8, and 10) that extends radially (i.e., toward the axial centerline 24 of the gas turbine engine 20) into the inner fixed structure 37. In some embodiments, the drag link fittings 12 are buried in the inner fixed structure 37 such that a radially outermost surface 64 (see FIGS. 7, 8, and 10) of the drag link fitting 12 is at least substantially radially aligned with an aerodynamic surface 66 (see FIGS. 7, 8, and 10) of the inner fixed structure 37. Referring to FIGS. 7, 8, and 10, in the illustrated embodiments the inner fixed structure 37 extends radially between an inner surface 68 and an aerodynamic surface 66. The aerodynamic surface 66 partially defines the bypass duct 40. The aerodynamic surface 66 may include one or more known noise suppression features that reduce acoustic noise present within the bypass duct 40. The inner fixed structure 37 includes a plurality of cavities 62, each of which extends radially between the inner surface 68 and the aerodynamic surface 66 of the inner fixed structure 37. Each of the drag link fittings 12 is disposed in one of the cavities 62 such that the outermost surface 64 of the drag link fitting 12 is at least substantially flush with the aerodynamic surface 66.

Referring to FIGS. 7, 8, and 10, each of the drag link fittings 12 includes an outer fitting 70 and an inner fitting 72. The outer fitting 70 is fastened to the inner fixed structure 37 of the thrust reverser 30 (see FIGS. 2-4). The inner fitting 72 is fastened to the outer fitting 70. The outermost surface 64 of each drag link fitting 12 can be defined by one or both of the outer fitting 70 and the inner fitting 72.

The outer fitting 70 of the drag link fitting 12 can be configured in various different ways. Referring still to FIGS. 7, 8, and 10, in the illustrated embodiments the outer fitting 70 includes an outer fitting base 74 and an outer fitting flange 76 that extends radially away from the outer fitting base 74. The outer fitting base 74 abuts the inner surface 68 of the inner fixed structure 37, and is fastened to the inner fixed structure 37 using a plurality of outer fitting screws 78 and outer fitting nuts 80 (see FIG. 7). The outer fitting screws 78 extend through apertures disposed in the outer fitting base 74, and extend through apertures disposed in the inner fixed structure 37. The outer fitting flange 76 is positioned within one of the cavities 62 of the inner fixed structure 37. The outer fitting flange 76 may abut the surface that defines the cavity 62. The outer fitting 70 of the drag link fitting 12 need not be fastened to the inner fixed structure 37 of the thrust reverser 30 in the manner illustrated in the drawings; other methods of fastening, and/or other types of fasteners, can additionally or alternatively be used.

The inner fitting 72 of the drag link fitting 12 can be configured in various different ways. Referring still to FIGS. 7, 8, and 10, in the illustrated embodiments the inner fitting 72 includes an inner fitting base 82, an inner fitting channel 84 (see FIGS. 8 and 10), first and second inner fitting bearings 86, 88 (see FIG. 8), and an inner fitting pin 90 (see FIGS. 8 and 10).

The inner fitting base 82 is positioned within the cavity 62 of the inner fixed structure 37 such that it abuts the outer fitting base 74 and the outer fitting flange 76 of the drag link fitting 12. The inner fitting base 82 is fastened to the outer fitting base 74 using one or more inner fitting screws 92, 94 (see FIGS. 7 and 10). The inner fitting screws 92, 94 extend through apertures disposed in the inner fitting base 82, and engage threaded apertures 96, 98 (see FIGS. 7 and 10) disposed in the outer fitting base 74. The inner fitting base 82 need not be fastened to outer fitting base 74 in the manner illustrated in the drawings; other methods of fastening, and/or other types of fasteners, can additionally or alternatively be used.

The inner fitting channel 84 extends radially into the inner fitting base 82, and is configured to receive the inner end portion 54 of the drag link 14. In some embodiments, at least one of the inner fitting screws 92, 94 extends through an aperture in a surface of the inner fitting base 82 that defines the inner fitting channel 84. Referring to FIG. 9, for example, in the illustrated embodiment the inner fitting 72 of the drag link fitting 12 includes first and second inner fitting screws 92, 94. The first inner fitting screw 92 extends through an aperture in a surface of the inner fitting base 82 that defines the inner fitting channel 84.

Referring to FIG. 8, in the illustrated embodiment the first and second inner fitting bearings 86, 88 are positioned within apertures that extend between the inner fitting channel 84 and an outer surface of the inner fitting base 82. The first and second inner fitting bearings 86, 88 are aligned about an inner fitting bearing axis 100. The inner fitting bearing axis 100 extends in a widthwise direction that is substantially normal to the axial centerline 24 of the gas turbine engine 20 (see FIG. 2). The first and second inner fitting bearings 86, 88 and the inner fitting pin 90 pivotably connect the inner end portion 54 of a drag link 14 to the inner fitting base 82. The inner fitting pin 90 is rotatably supported by the drag link bearing 58 and the first and second inner fitting bearings 86, 88. The axial ends of the inner fitting pin 90 abut the outer fitting flange 76 portion of the drag link fitting 12. That is, the outer fitting 70 keeps the hinge pin 90 in place when the inner fitting 72 is positioned between the outer fitting flange 76. The inner fitting pin 90 is operable to rotate about the drag link bearing axis 60 and the inner fitting bearing axis 100, which are axially aligned with one another.

Referring to FIG. 8, a method for installing the illustrated embodiments of the drag link assembly 10 includes the following steps: (1) securing the outer fitting 70 of the drag link fitting 12 to the inner fixed structure 37 using the plurality of outer fitting screws 78 and outer fitting nuts 80 or another suitable attachment method; (2) pivotably connecting the outer end portion 52 of the drag link 14 to an aft end of a blocker door 46 (see FIGS. 3 and 4) using one or more known means; (3) positioning the inner end portion 54 of the drag link 14 within the inner fitting channel 84 of the inner fitting 72 such that the drag link bearing 58 is axially aligned with the inner fitting bearing axis 100; (4) positioning the inner fitting pin 90 relative to the first and second inner fitting bearings 86, 88 and the drag link bearing 58 to thereby pivotably connect the inner end portion 54 of the drag link 14 to the inner fitting 72 of the drag link fitting 12; and (5) positioning the inner fitting 72 of the drag link fitting 12 between the outer fitting flanges 76 and securing it to the outer fitting 70 of the drag link fitting 12 using the inner fitting screws 92, 94.

A method for uninstalling the illustrated embodiments of the drag link assembly 10 includes the following steps: (1) removing the inner fitting screws 92, 94 to thereby separate the inner fitting 72 of the drag link fitting 12 from the outer fitting 70 of the drag link fitting 12; (2) removing the inner fitting pin 90 from the first and second inner fitting bearings 86, 88 and the drag link bearing 58; (3) removing the inner end portion 54 of the drag link 14 from the inner fitting channel 84 of the inner fitting 72; (4) disconnecting the outer end portion 52 of the drag link 14 from the aft end of a blocker door 46 (see FIGS. 3 and 4); and (5) removing the plurality of outer fitting screws 78 and outer fitting nuts 80 to thereby separate the outer fitting 70 of the drag link fitting 12 from the inner fixed structure 37.

In embodiments in which at least one of the inner fitting screws 92, 94 extends through an aperture in a surface of the inner fitting base 82 that defines the inner fitting channel 84, it may be necessary to position the drag link 14 in its stowed position or its deployed position before the respective inner fitting screw 92, 94 can be installed or uninstalled. Referring to FIG. 8, for example, when the drag link 14 is in its stowed position (shown in FIG. 8), the inner end portion 54 of the drag link 14 blocks access to the first inner fitting screw 92; however, when the drag link 14 is in its deployed position (not shown), the inner end portion 54 of the drag link 14 is positioned such that the first inner fitting screw 92 is accessible. Thus, in this embodiment, the drag link 14 must be positioned in its deployed position (not shown) before the first inner fitting screw 92 can be installed or uninstalled.

The present drag link assembly 10 offers several significant advantages.

Because the present drag link fitting 12 is buried in the inner fixed structure 37 of the thrust reverser 30 (see FIGS. 2-4), the present drag link assembly 10 provides improved aerodynamic flow of the bypass airstream 48 through the bypass duct 40, as compared to previous drag link assembly designs. In previous designs, the drag link fittings are mounted to the aerodynamic surface of the inner fixed structure of the thrust reverser, and the drag link fittings extend radially into the bypass duct and negatively impact the aerodynamic flow of the bypass airstream through the bypass duct.

A maintenance provider can easily remove the drag link 14 and portions of the drag link fitting 12 via the bypass duct 40. That is, it is not necessary to access the inner surface 68 of the inner fixed structure 37 in order to remove the drag link 14 and portions of the drag link fitting 12. This is despite the fact that the drag link fitting 12 is buried in the inner fixed structure 37 of the thrust reverser 30. The burying of the drag link fitting 12 in the inner fixed structure 37 prevents only the outer fitting 70 portion of the drag link fitting 12 from being easily removed via the bypass duct 40; however, the outer fitting 70 is the component of the drag link assembly 10 that is least likely to be removed for repair or replacement (e.g., it may be permanently fasten to the inner fixed structure 37 for the entire lifetime of the thrust reverser 30).

Figure 11:
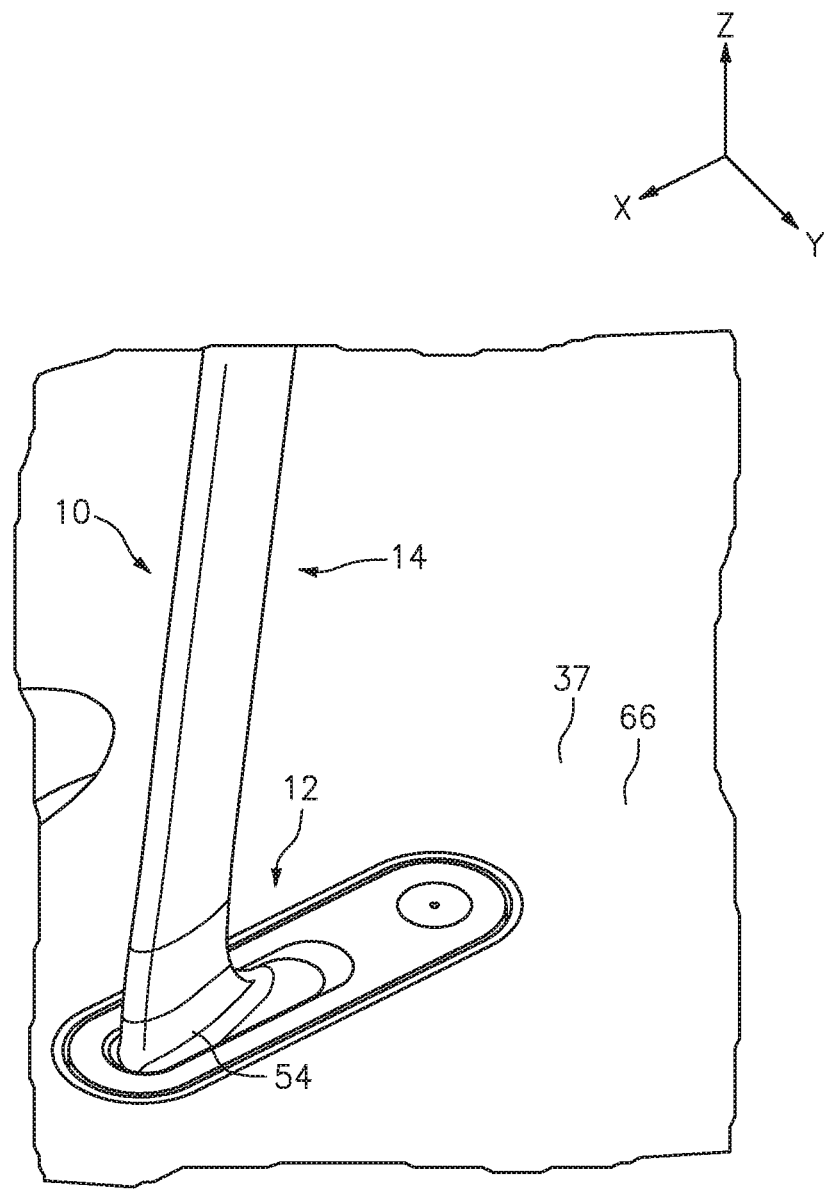
FIG. 11 is a perspective view of another drag link assembly embodiment.

The "clubfoot" drag link 14 embodiments shown in FIGS. 9-12 can achieve aerodynamic advantages over the "straight" drag link 14 embodiment shown in FIGS. 5, 6, and 8. The "straight" drag link 14 embodiment requires that the inner fitting channel 84 of the drag link fitting 12 (see FIG. 8) extend aft of the inner end portion 54 of the drag link 14 to permit the drag link 14 to pivot to its deployed position without clashing within the inner fitting base 82 of the drag link fitting 12 (see FIG. 8). FIG. 6 shows the drag link 14 in its deployed position, with the inner end portion 54 of the drag link 14 positioned partially within the inner fitting channel 84 of the drag link fitting 12 (see FIG. 8). In the "straight" drag link 14 embodiment, when the drag link 14 is in its stowed position, the inner fitting channel 84 is partially exposed to the bypass duct 40 and thereby creates aerodynamic drag. In contrast to the "straight" drag link 14 embodiment, the "clubfoot" drag link 14 embodiments allow the drag link 14 to pivot about a pivot point that is behind (i.e., aft of), and offset from, the radially-extending axis of the shaft portion of the drag link 14. Thus, when the "clubfoot" drag link 14 pivots to its deployed position (see FIG. 9), it is not necessary that the inner fitting channel 84 of the drag link fitting 12 (see FIG. 8) extend aft of the inner end portion 54 of the drag link 14 to permit the drag link 14 to pivot to its deployed position without clashing within the inner fitting base 82 of the drag link fitting 12 (see FIG. 8). FIG. 11 illustrates that the inner fitting channel 84 does not extend aft of the inner end portion 54 of the drag link 14. In "clubfoot" drag link 14 embodiments, the inner fitting channel 84 can be at least substantially covered by the inner end portion 54 of the drag link 14 when the drag link 14 is in its stowed position, which can eliminate aerodynamic drag that might otherwise result from the inner fitting channel 84 being partially exposed to the bypass duct 40.

The position of the inner fitting screw 92 shown in FIG. 10 is advantageous because the inner fitting screw 92 is not exposed to the bypass duct 40 when the drag link 14 is in its stowed position. In the stowed position, the inner end portion 54 of the drag link 14 substantially covers the inner fitting screw 92, and thereby eliminates aerodynamic drag that might otherwise result from the inner fitting screw 92 being positioned such that it is exposed to the bypass duct 40 when the drag link 14 is in its stowed position.

Figure 12:
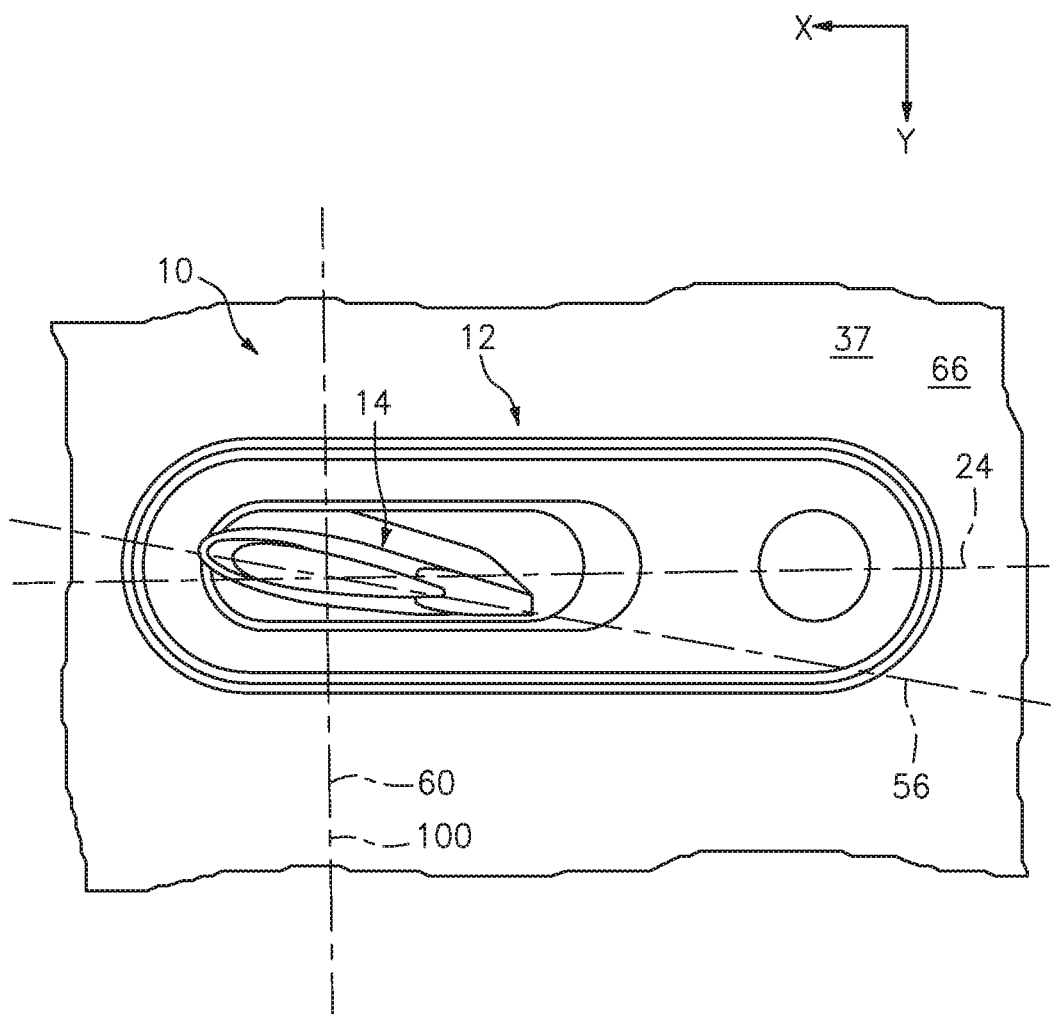
FIG. 12 is a plan view of the drag link assembly of FIG. 11.

The "twisted" drag link 14 embodiment shown in FIGS. 11 and 12 can achieve aerodynamic advantages over the "in-line" drag link 14 embodiments shown in FIGS. 5-10. In some gas turbine engine 20 embodiments, the bypass airstream 48 (see FIGS. 3 and 4) may pass through a portion of the bypass duct 40 proximate the drag link 14 in a flow direction that is not in-line with (e.g., not parallel with) the axial centerline 24 of the gas turbine engine 20. In such embodiment, if an "in-line" drag link 14 is used, the flow direction of the bypass airstream 48 may not be aligned with the axis extending between the leading edge and the trailing edge of the shaft portion of the drag link 14. This, in turn, could generate unacceptably high amounts of aerodynamic drag. The aerodynamic drag could be minimized by instead using a drag link 14 that is "twisted" such that the axis 56 (see FIG. 12) extending between the leading edge and the trailing edge of the shaft portion of the drag link 14 is aligned with the flow direction of the bypass airstream 48.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A thrust reverser of a gas turbine propulsion system for an aircraft, comprising:
   a blocker door which pivots between a stowed position, and a deployed position in which the blocker door redirects air to generate reverse thrust;
   a drag link fitting fastened to a fixed structure of the thrust reverser at least in part by a fastener, the fixed structure forming a radially inner peripheral boundary of a bypass duct within the gas turbine propulsion system; and
   a drag link having a first end and a distal second end, the first end being pivotably attached to the blocker door, and the distal second end being pivotably attached to the drag link fitting at a pivot point;
   wherein the distal second end of the drag link is disposed at least partially in a channel of the drag link fitting, the fastener is disposed at least partially in the channel, and the fastener is axially overlapped by and below the distal second end of the drag link; and
   wherein the drag link extends straight at least substantially along a radially-extending drag link axis, and the pivot point is offset from the radially-extending drag link axis.

2. The thrust reverser of claim 1, wherein the fastener is at least substantially covered by the drag link when the drag link is in a first pivot position relative to the drag link fitting, and the fastener is at least partially exposed when the drag link is in a second pivot position relative to the drag link fitting.

3. The thrust reverser of claim 2, wherein the fastener is at least partially exposed to a bypass airstream flowing through the bypass duct of the thrust reverser when the drag link is in the second pivot position relative to the drag link fitting.

4. The thrust reverser of claim 1, wherein the channel is at least substantially covered by the drag link when the drag link is in a first pivot position relative to the drag link fitting, and the channel is at least partially exposed when the drag link is in a second pivot position relative to the drag link fitting.

5. The thrust reverser of claim 4, wherein the channel is at least partially exposed to a bypass airstream flowing through the bypass duct of the thrust reverser when the drag link is in the second pivot position relative to the drag link fitting.

6. The thrust reverser of claim 1, wherein the pivot point is aft of the radially-extending drag link axis.

7. The thrust reverser of claim 1, wherein the drag link has a clubfoot configuration.

8. The thrust reverser of claim 1, wherein the distal second end of the drag link comprises a curved section.

9. The thrust reverser of claim 1, wherein
   the distal second end of the drag link is disposed laterally between and pivotally attached to first and second portions of the drag link fitting; and
   the distal second end of the drag link is laterally aligned with the fastener.

10. The thrust reverser of claim 1, further comprising a cascade, the blocker door axially overlapping the cascade relative to an axial centerline of the gas turbine propulsion system.

11. The thrust reverser of claim 1, wherein the pivot point includes an inner fitting pin, and the inner fitting pin has axial ends abutting the drag link fitting.

12. The thrust reverser of claim 1, wherein the blocker door is configured to pivot radially inwards, in a direction towards the fixed structure, from the stowed position to the deployed position.

13. The thrust reverser of claim 1, wherein the drag link extends across the bypass duct when the blocker door is in the stowed position.

14. A thrust reverser of a gas turbine propulsion system for an aircraft, comprising:
   a fixed structure of the thrust reverser;
   a blocker door configured to pivot radially inwards, in a direction towards the fixed structure, from a stowed position to a deployed position in which the blocker door redirects air to generate reverse thrust;
   a drag link fitting fastened to the fixed structure of the thrust reverser at least in part by a fastener;
   a drag link having a first end and a distal second end, the first end being pivotably attached to the blocker door, and the distal second end being pivotably attached to first and second portions of the drag link fitting such that the distal second end is pivotable about a laterally extending axis; and
   wherein the distal second end of the drag link is disposed at least partially in a channel of the drag link fitting and laterally between the first and the second portions of the drag link fitting, the fastener is disposed at least partially in the channel and laterally aligned, relative to the laterally extending axis, with the distal second end of the drag link, and the distal second end of the drag link axially overlaps, relative to the laterally extending axis, the fastener when the blocker door is in the stowed position.

15. The thrust reverser of claim 14, wherein
the distal second end of the drag link is pivotably attached to the first and the second portions of the drag link fitting at a pivot point;
the drag link extends at least substantially along a radially-extending drag link axis from the first end towards the distal second end; and
the pivot point is offset from the radially-extending drag link axis.

16. The thrust reverser of claim 15, wherein the pivot point is aft of the radially-extending drag link axis.

17. The thrust reverser of claim 15, wherein the pivot point includes an inner fitting pin, and the inner fitting pin has axial ends abutting the drag link fitting.

18. The thrust reverser of claim 14, wherein fixed structure forms a radially inner peripheral boundary of a bypass duct within the gas turbine propulsion system.

19. A thrust reverser of a gas turbine propulsion system for an aircraft, comprising:
   a fixed structure of the thrust reverser;
   a blocker door configured to pivot radially inwards, in a direction towards the fixed structure, from a stowed position to a deployed position in which the blocker door redirects air to generate reverse thrust;
   a drag link fitting fastened to the fixed structure of the thrust reverser at least in part by a fastener; and
   a drag link having a first end and a distal second end, the first end being pivotably attached to the blocker door, and the distal second end being pivotably attached to the drag link fitting;
wherein the distal second end of the drag link is disposed at least partially in a channel of the drag link fitting, and the fastener is disposed at least partially in the channel and below the distal second end of the drag link; and
wherein the fastener is at least substantially axially covered by the drag link when the drag link is in a first pivot position relative to the drag link fitting, and the fastener is at least partially exposed to a bypass airstream duct of the thrust reverser when the drag link is in a second pivot position relative to the drag link fitting such that the fastener is more exposed to the bypass airstream duct when the drag link is in the second pivot position rather than when the drag link is in the first pivot position.

20. The thrust reverser of claim 19, wherein
the distal second end of the drag link is pivotably attached to first and second portions of the drag link fitting at a pivot point;
the drag link extends at least substantially along a radially-extending drag link axis from the first end towards the distal second end;
the pivot point is offset from the radially-extending drag link axis; and
the pivot point includes an inner fitting pin, and the inner fitting pin has axial ends abutting the drag link fitting.

* * * * *